Patented Jan. 7, 1947

2,413,716

UNITED STATES PATENT OFFICE 2,413,716

SYNTHETIC RESIN

William O. Kenyon and Louis M. Minsk, Rochester, N. Y., assignors to Eastman Kodak Company, Rochester, N. Y., a corporation of New Jersey No Drawing. Application March 14, 1942, Serial No. 434,778

16 Claims. (Cl. 260—83)

This invention relates to a synthetic thermoplastic resin and more particularly to a thermoplastic resin obtained from a polymer comprising α-halogenacrylic acid units.

It is known that α-chlor- and α-bromacrylic acids can be polymerized and that halogen can be removed from such polymers to give lactones. These lactones, when dry, are easily pulverizable masses of little coherence and low solubility in organic solvents. These properties would appear to indicate that cross-linking occurs between the polymeric molecules during the removal of halogen. See Marvel et al. J. Am. Chem. Soc. 61, 3156 (1939) and 62, 3495 (1940).

We have now found that if the halogen is removed from polymers comprising α-halogenacrylic acid units, in the presence of an alcohol, the resulting resinous material is a coherent thermoplastic mass of relatively high solubility in organic solvents.

In our new process, the alcohol appears to retard cross-linking. While the exact structure of our new resins is not known, we have found that our process results in a part of the carboxyl groups being esterified (i. e., converted to carbalkoxyl groups) and a part of the carboxyl groups being reacted with a part of the halogen to form lactone rings.

We have found that our new resins, unlike the lactones described by Marvel et al. can be readily molded and extruded when suitably plasticized and that film or sheet can be made therefrom by coating thin layers of a solution of the resins in an organic solvent, and causing the solvent to evaporate. Threads can be made from our resins by extruding a solution of the resins in an organic solvent, into a heated chamber or a precipitating medium and spinning the resulting extruded fibers to a thread.

It is, therefore, an object of our invention to provide new resins and a process for preparing them. A further object is to provide film or sheet of such resins. A further object is to provide threads of such resins. Other objects will become apparent hereinafter.

In accordance with our invention, we remove halogen from a polymer comprising α-halogenacrylic acid units, in the presence of an alcohol. The halogen can be removed by merely heating the polymer, in the presence of an alcohol. More advantageously, however, the halogen is removed by hydrolysis, i. e., by treating the polymer with water in the presence of an alcohol. Heat, of course, accelerates the hydrolysis.

The polymer containing the α-halogenacrylic acid units frequently is insoluble in the alcohol employed, and the removal of halogen can be effected by merely heating a suspension of the polymer in the alcohol. More advantageously, however, a solution of the polymer is employed.

In the case of alcohols in which water is appreciably soluble, such as methyl, ethyl, propyl and butyl alcohols, such a solution can usually be effected by employing water along with the alcohol. The amount of water employed is advantageously about one-tenth the volume of the alcohol employed. In general increasing the quantity of water decreases the halogen content of the resins, and increases the carboxyl group and lactone group content of the resins. Increased carboxyl group content is accompanied by an increase of water susceptibility in the finished resin. In cases where water is not sufficiently compatible with the alcohol, homogeneity can be obtained by employing a homogenizing agent which with the alcohol and the polymer gives a solution. 1,4-dioxane is especially useful as a homogenizing agent, with or without water.

As polymers comprising α-halogenacrylic acid units, we can employ the homopolymeric α-halogenacrylic acids in which all the units are α-halogenacrylic acid units, or we can employ copolymers of α-halogenacrylic acids with other polymerizable organic compounds, in which case only a part of the units are α-halogenacrylic acid units. Our invention is especially directed to polymers comprising α-chlor- and α-bromoacrylic acid units and more especially to the homopolymers of α-chlor- and α-bromacrylic acids. Poly-α-halogenacrylic acids prepared by polymerization of α-halogenacrylic acids in 1,4-dioxane are especially suitable starting materials for our new process.

Our invention is especially directed to resins obtained using monohydric alcohols, particularly primary and secondary alcohols. More especially our invention is directed to resins obtained using primary monohydric alcohols of the formula $C_nH_{2n+1}OH$ wherein $n$ represents a positive integer of from two to six.

In carrying out our invention, a mineral acid catalyst can be added to the reaction mixture if desired. However, inasmuch as the halogen appears to be removed as hydrogen halide, thereby providing a mineral acid in the reaction mixture, incorporation of additional mineral acid is not essential.

The following examples are exemplary of our new resins and our process for preparing the same.

*Example 1.—n-Primary butyl resin from poly-α-chloracrylic acid*

500 g. of α-chloracrylic acid, dissolved in 1000 cc. of dry 1,4-dioxane containing 1.5 g. of benzoyl peroxide, were heated at 50° C. on a water bath for 24 hours, in glass apparatus equipped with a reflux condenser and protected from the moisture of the atmosphere by means of a calcium chloride tube. The resulting mixture was diluted with about two liters of dry 1,4-dioxane. The diluted mixture was poured into about 10 times its volume of diethyl ether, in order to precipitate the poly-α-chloracrylic acid. The precipitated poly-α-chloracrylic acid was washed with several changes of diethyl ether and was then dried in vacuo.

100 g. of the poly-α-chloracrylic acid obtained as set forth above were dispersed in 400 cc. of a mixture of n-primary butyl alcohol and distilled water (10 volumes of the alcohol to one of water), by heating on a steam bath. When dispersion was complete, about 150 cc. of the same n-primary butyl alcohol-water mixture containing 5 cc. of concentrated sulfuric acid, were added to the dispersion. The resulting mixture was heated on a steam bath for 4 hours. The supernatant liquor was then decanted and the cake of resin dispersed in 700 cc. of acetone. The acetone solution was then poured into about 10 times its volume of distilled water, in order to precipitate the resin. The precipitated resin was washed with water, centrifuged and then redispersed in 700 cc. of acetone. The resin was again precipitated by pouring into water, again washed and centrifuged, and finally dried at 50° to 60° C. This resin contained 7.55% by weight of chlorine and a carboxyl group content equivalent to 0.55 cc. of N sodium hydroxide solution per gram of resin.

Resins of substantially the same composition and properties were similarly prepared from poly-α-chloracrylic acid prepared by polymerizing α-chloracrylic acid, without benzoyl peroxide.

*Example 2.—n-Primary butyl resin from α-chloracrylic acid polymer prepared by polymerizing α-chloracrylic acid with vinyl acetate*

74.9 g. of α-chloracrylic acid, 60.2 g. of vinyl acetate (freshly distilled) and 0.135 g. of benzoyl peroxide were heated in a glass apparatus, under reflux, at 50° C. in a constant temperature bath. A clear solution was obtained almost immediately. After 24 hours heating, the solution had become a solid white mass. The reaction mixture was removed from the bath, cooled, and to it were added 300 cc. of a solution of 90 parts of acetone and 10 parts of distilled water. By shaking the resulting mixture a clear, moderately viscous, light yellow solution was obtained. The polymeric material containing α-chloracrylic acid units was precipitated by pouring the viscous solution into about 10 times its volume of diethyl ether. The precipitated product was washed with several changes of diethyl ether and finally dried for one hour in vacuo.

450 g. of polymeric material prepared as set forth above were dispersed in a mixture of 2000 cc. of n-primary butyl alcohol and distilled water (10 volumes of alcohol to one of water) by heating on a steam bath. A light yellow, moderately viscous solution was obtained. After cooling, there were added 22.5 cc. of concentrated sulfuric acid dissolved in 475 cc. of the aforesaid mixture of butyl alcohol and water with stirring. The resulting mixture was heated for 5 hours on the steam bath, at the end of which period a tan cake of resin had formed. The reaction mixture was cooled, the supernatant liquid poured off and 4000 cc. of acetone added to the cake. By shaking, a clear dark tan, moderately viscous solution was obtained. The n-primary butyl resin was precipitated by pouring the moderately viscous solution into about 10 times its volume of distilled water, and was then washed with several changes of distilled water and centrifuged. The precipitated resin was redissolved in 4000 cc. of acetone. The resulting solution was again poured into water to precipitate the resin. The precipitated resin was washed with water, centrifuged and dried at 50° to 60° C. in an air oven. This resin contained 7.7% by weight of chlorine and a carboxyl group content equivalent to 0.6 cc. of N sodium hydroxide solution per gram of resin.

*Example 3.—n-Primary butyl resin from poly-α-chloracrylic acid without isolation of the poly-α-chloracrylic acid*

500 g. of α-chloracrylic acid dissolved in 1000 cc. of dry 1,4-dioxane containing 1.5 g. of benzoyl peroxide, the whole being contained in an all glass apparatus equipped with a reflux condenser and being protected from atmospheric moisture by means of a calcium chloride tube, were heated in a bath at 50° C. for 24 hours. A clear, colorless, viscous solution resulted.

To 760 g. of the above solution (½ of the above batch) were added 875 cc. (3½ cc. per gram of α-chloracrylic acid originally present in this portion) of a mixture of n-primary butyl alcohol and distilled water (10 volumes of alcohol to 1 of water) which had been previously warmed to 75° C. The resulting mixture was heated, under reflux, on a steam bath with occasional stirring. A clear viscous solution was obtained in a short time. Heating on the steam bath was continued for 24 hours. No precipitation of resin occurred while the reaction mixture was hot. The warm solution was diluted with 500 cc. of acetone. The diluted solution was poured into 10 times its volume of distilled water in order to precipitate the resin. The resin precipitated as a gummy product which was kneaded in fresh portions of distilled water until it hardened. It was then centrifuged, and redissolved in 2100 cc. of acetone and reprecipitated in distilled water. The fibrous precipitate was treated with several changes of distilled water to complete the removal of solvents and acid. The product after centrifuging was dried 48 hours at 55° C. 212 g. of product were obtained. This resin contained 7.96% by weight of chlorine and a carboxyl group content equivalent to 0.73 cc. of N- sodium hydroxide solution per gram of resin.

*Example 4.—Ethyl resin from poly-α-chloracrylic acid*

100 g. of poly-α-chloracrylic acid, prepared according to the process given in Example 1, were dispersed in 400 cc. of a mixture of ethyl alcohol and distilled water (10 volumes of the alcohol to one of water), by heating on a steam bath. When dispersion was complete, about 150 cc. of the same ethyl alcohol-water mixture containing 5 cc. of concentrated sulfuric acid, were added to the dispersion. The resulting mixture was heated on a steam bath 4 hours. The supernatant liquor was then decanted and the cake of resin dispersed in about 700 cc. of acetone. The acetone solution was then poured into about 10 times its volume of distilled water, in order to precipitate the resin. The precipitated resin was washed with water, centrifuged and then redispersed in about 700 cc. of acetone. The resin was again precipitated by pouring into water, again washed and centrifuged, and finally dried at 50° to 60° C. This resin contained 8.35% by weight of chlorine and a carboxyl group content equivalent to 1.22 cc. of N sodium hydroxide solution per gram of resin. The resin contained an ethoxyl group content equivalent to 16.7% by weight of $C_2H_5O$.

*Example 5.—Methyl resin from poly-α-chloracrylic acid*

A methyl resin was prepared in a manner identical with that described in Example 4, using methyl alcohol instead of ethyl alcohol. This resin contained 8.19% of chlorine and a carboxyl group content equivalent to 3.26 cc. of N sodium hydroxide solution per gram of resin. The resin contained a methoxyl group content equivalent to 8.2% by weight of $CH_3O$.

*Example 6.—n-Propyl resin from poly-α-chloracrylic acid*

A n-propyl resin was prepared in a manner identical with that described in Example 4, using n-propyl alcohol instead of ethyl alcohol. This resin contained 7.38% by weight of chlorine and a carboxyl group content equivalent to 0.48 cc. of N sodium hydroxide solution per gram of resin.

*Example 7.—n-Propyl resin from poly-α-chloracrylic acid*

A n-propyl resin was prepared in a manner identical with that described in Example 3, using n-propyl instead of n-primary butyl alcohol. This resin contained 7.93% by weight of chlorine and a carboxyl group content equivalent to 0.89 cc. of N sodium hydroxide solution per gram of resin.

*Example 8.—n-Primary amyl resin from poly-α-chloracrylic acid*

50 g. of poly-α-chloracrylic acid prepared as in Example 1 were dispersed in a mixture of 100 cc. of 1,4-dioxane, 160 cc. of n-primary amyl alcohol and 16 cc. of distilled water. The resulting mixture was heated on a steam bath for 24 hours, under reflux. The mixture diluted with 200 cc. of acetone and a small amount of insoluble material filtered off. The filtered solution was poured into 3 liters of a mixture of ethyl alcohol and distilled water (one volume of alcohol to one of water) to precipitate the resin. The precipitated resin was kneaded with 2 liters of the aforesaid ethyl alcohol-water mixture and finally washed with distilled water. The resin was redissolved in 250 cc. of acetone and precipitated by pouring into distilled water. The precipitated resin was washed with distilled water, centrifuged and dried at 55° C. for 48 hours. This resin contained 5.95% by weight of chlorine and a carboxyl group content equivalent to 0.89 cc. of N sodium hydroxide solution per gram of resin.

*Example 9.—n-Primary hexyl resin from poly-α-chloroacrylic acid*

100 g. of α-chloroacrylic acid were dispersed in 200 cc. of dry 1,4-dioxane containing 0.30 g. of benzoyl peroxide, the whole being contained in an all-glass apparatus equipped with a reflux condenser and being protected from atmospheric moisture by means of a calcium chloride tube, and heated in a bath at 50° C. for 24 hours. A clear, colorless, viscous solution resulted.

To the above viscous solution were added 350 cc. of a solution, previously warmed to 70° C., of 10 parts of n-primary hexyl alcohol and 1 part of distilled water. With agitation, a smooth dope was obtained. This was heated on the steam bath under a reflux condenser for 24 hours. The reaction mixture was removed from the bath, cooled to 50° C., and diluted with 200 cc. of acetone. The resin was precipitated by pouring the solution into 3 liters of a 1:1 solution of alcohol and distilled water, and the precipitated resin washed first with several fresh changes of the above mixture and then with distilled water. The resin was centrifuged, dispersed in 850 cc. of acetone with agitation and then again precipitated by pouring the dispersion into 10 vol. of distilled water. The product was washed with fresh changes of distilled water, and then extracted with two 2–1 portions of alcohol to remove residual hexyl alcohol. It was again washed with distilled water, centrifuged, and dried at 55° C.

This resin contained 8.12% by weight of chlorine and a carboxyl group content equivalent to 0.66 cc. of N sodium hydroxide solution per gram of resin.

*Example 10.—Lauryl resin from poly-α-chloracrylic acid*

100 g. of α-chloracrylic acid were dispersed in 200 cc. of dry 1,4-dioxane containing 0.30 g. of benzoyl peroxide, the whole being contained in an all-glass apparatus equipped with a reflux condenser and being protected from atmospheric moisture by means of calcium chloride tubes, and heated in a bath at 50° C. for 24 hours. A clear, colorless, viscous solution resulted.

To the above viscous solution, a solution, previously warmed to 70° C., of 200 cc. of lauryl alcohol in 200 cc. of dry 1,4-dioxane were added. The mixture was heated, under reflux, on a steam bath for 48 hours. A smooth, clear, dark wine colored solution was obtained. This solution was cooled and diluted with 300 cc. of acetone. The diluted solution was then poured into about three liters of a mixture of ethyl alcohol and water (1 volume to 1 volume) in order to precipitate the lauryl resin. The resin was washed and kneaded with 2 three liter portions of the aforesaid ethyl alcohol-water mixture and then with one three liter portion of absolute ethyl alcohol. The resin was transferred to distilled water and further kneaded. The liquid was centrifuged from the resin and the resin was dissolved in 1500 cc. of acetone. The resulting solution was poured into three or four times its volume of distilled water in order to precipitate the resin. The resin was washed with distilled water, centrifuged and dried at 55° C. The resin was then extracted with Skellysolve G (essentially low-boiling saturated hydrocarbons) to remove any residual lauryl alcohol. The resin was dried at 55° C. for 24 hours. The resin contained 6.29% by weight of chlorine and a carboxyl group content equivalent to 1.45 cc. of N sodium hydroxide per gram of resin.

*Example 11.—Isopropyl resin from poly-α-chloracrylic acid*

An isopropyl resin was prepared in a manner identical with that described in Example 3, using isopropyl alcohol instead of n-primary butyl alcohol. The resin contained 8.44% by weight of chlorine and a carboxyl group content equivalent to 1.1 cc. of N sodium hydroxide per gram of resin.

*Example 12.—Benzyl resin from poly-α-chloracrylic acid*

50 g. of α-chloracrylic acid were dispersed in 100 cc. of dry, 1,4-dioxane containing 0.15 g. of benzoyl peroxide, the whole being contained in an all glass apparatus equipped with a reflux condenser and being protected from atmospheric moisture by means of a calcium chloride tube, were heated in a bath at 50° C. for 42 hours. A clear, viscous solution results.

To half of the above viscous solution, 300 cc. of benzyl alcohol, previously warmed to 70° C., were added. The mixture was heated on a steam bath for 24 hours. The solution was then poured into two or three times it volume of a mixture of ethyl alcohol and water (7 volumes of alcohol to 3 of water), in order to precipitate the resin. The resin was washed with the same mixture of alcohol and water, and then with ethyl alcohol and then redispersed in acetone. The acetone solution was poured into distilled water, in order to precipitate the resin. The resin was washed with water and dried at 55° C. The resin contained 8.86% by weight of chlorine and a carboxyl group content equivalent to 1.1 cc. of N sodium hydroxide solution per gram of resin.

*Example 13.—n-Primary butyl resin from copolymer of α-chloracrylic acid and methyl methacrylate*

80 g. of α-chloracrylic acid and 20 g. of methyl methacrylate were dissolved in 200 cc. of dry 1,4-dioxane containing 0.3 g. of benzoyl peroxide, in an all glass apparatus equipped with a reflux condenser, and a calcium chloride tube to protect the materials in the apparatus from atmospheric moisture. The mixture was heated in a 50° C. water bath for 24 hours. A clear viscous solution resulted.

To the clear viscous solution were added 350 cc. of a mixture of n-primary butyl alcohol and distilled water (10 volumes of alcohol to 1 of water) which had been previously heated to 70° C. The resulting mixture was heated on a steam bath for 23 hours. During the early stages of heating, the mixture was vigorously agitated. After the heating period, the mixture was diluted with 600 cc. of acetone. The diluted mixture was poured into 10 times its volume of distilled water, in order to precipitate the resin. The precipitated resin was washed with distilled water, centrifuged and redissolved in 1200 cc. of acetone, with agitation. The acetone solution was poured into 10 volumes of distilled water to precipitate the resin. The precipitated resin was washed with fresh portions of distilled water, centrifuged and dried at 55° C. for 48 hours. The resin contained 8.33% by weight of chlorine and a carboxyl group content equivalent to 1.21 cc. of N sodium hydroxide per gram of resin.

*Example 14.—n-Primary butyl resin from copolymer of α-chloracrylic acid and styrene*

80 g. of α-chloracrylic acid and 20 g. of styrene were dissolved in 200 cc. of dry 1,4-dioxane containing 0.3 g. of benzoyl peroxide, in an all glass apparatus equipped with a reflux condenser and a calcium chloride tube to protect the materials in the apparatus from atmospheric moisture. The mixture was heated in a 50° C. water bath for 24 hours. A clear solution was obtained. The solution was less viscous than in the case of copolymerization of methyl methacrylate and α-chloracrylic acid.

To the above solution were added 350 cc. of a mixture of n-primary butyl alcohol and distilled water (10 volumes of alcohol to 1 of water) which had been previously heated to 70° C. After agitation, a clear solution was obtained. The solution was heated on a steam bath for 23 hours. The solution was then diluted with 400 cc. of acetone and the diluted mixture poured into 10 times its volume of distilled water to precipitate the resin. The precipitated resin was washed and extracted with fresh portions of distilled water and then gently centrifuged (because of softness) to remove water. The resin was redissolved in 800 cc. of acetone with agitation. The solution was poured into 10 times its volume of water to precipitate the resin. The precipitated resin was washed with fresh portions of distilled water and centrifuged. The resin was dried at 55° C. for 24 hours. The resin contained 12.66% by weight of chlorine and a carboxyl group content equivalent to 0.36 cc. of N sodium hydroxide per gram of resin.

*Example 15.—n-Primary butyl resin from poly-α-chloracrylic acid prepared by polymerization in n-primary butyl alcohol*

100 g. of α-chloracrylic acid were placed in 200 cc. of anhydrous n-primary butyl alcohol along with 0.3 g. of benzoyl peroxide, in an all glass apparatus equipped with a reflux condenser, and a calcium chloride tube to protect the materials in the apparatus from atmospheric moisture. The mixture was heated in a 50° C. water bath for 23 hours. A clear tan viscous solution resulted.

To the clear tan viscous solution were added 350 cc. of a mixture of n-primary butyl alcohol and distilled water (10 volumes of alcohol to 1 of water) which had been previously heated to 70° C. The resulting mixture was heated on a steam bath with agitation. A moderately viscous solution was obtained. After 4 hours of heating, a cake of resin had precipitated. The supernatant liquid was then poured off and the cake of resin was dissolved in 1100 cc. of acetone with a mechanical shaker. The acetone solution was poured into 10 times the volume of distilled water to precipitate the resin. The precipitated resin was washed with distilled water centrifuged to remove water and redissolved in 1 liter of acetone. The acetone solution was again poured into 10 times its volume of distilled water in order to precipitate the resin. The precipitated resin was washed with distilled water, centrifuged and finally dried at 55° C. The resin contained 10.19% by weight of chlorine and a carboxyl group content equivalent to 0.31 cc. of N sodium hydroxide per gram of resin.

*Example 16.—n-Primary butyl resin from poly-α-chloracrylic acid suspended in n-primary butyl alcohol*

10 g. of poly-α-chloracrylic acid were placed in 55 cc. of n-primary butyl alcohol. The mixture was heated on a steam bath under reflux for 24 hours. Solution did not take place although the insoluble material softened and became transparent. The supernatant liquid was poured off and 80 cc. of acetone were added. With agitation a clear acetone solution was obtained, practically all of the resinous material dissolving. The acetone solution was poured into 800 cc. of distilled water to precipitate the resin. The resin was washed with distilled water and then redissolved in 100 cc. of acetone. The acetone solution was again poured into 800 cc. of distilled water to precipitate the resin. The precipitated resin was washed with distilled water and dried at 55° C. for 24 hours. The resin contained 8.72% by weight of chlorine and a carboxyl group content equivalent to 0.1 cc. of N sodium hydroxide per gram of resin.

*Example 17.—n-Primary butyl resin from poly-α-bromacrylic acid*

5 g. of α-bromacrylic acid were placed in 10 cc. of dry benzene in an all glass apparatus equipped with a reflux condenser, and a calcium chloride tube to protect the materials in the apparatus from atmospheric moisture. The mixture was heated in a 50° C. water bath for 24 hours. A white porcelain-like cake of polymer was obtained.

To the above reaction mixture were added 20 cc. of a mixture of n-primary butyl alcohol and distilled water (10 volumes of alcohol to 1 of water) which had been previously heated to 70° C. The resulting mixture was heated on a steam bath with occasional stirring. In a short time, a tan solution was obtained. The mixture was heated in all for 7¼ hours. During the heating period, a soft resinous material precipitated from solution and then redissolved. After the heating period the mixture was poured into 400 cc. of distilled water and a soft gummy product precipitated. This was washed with several portions of distilled water and finally left in contact with distilled water for 70 hours. After this treatment, the soft mass had changed to a firm cake. This was rung to remove water and redissolved in 20 cc. of acetone. The acetone solution was poured into distilled water and a yellow granular resin precipitated. The resin was washed with distilled water and dried at 55° C. The resin contained 11.86% of bromine and a carboxyl group content equivalent to 0.4 cc. of N sodium hydroxide per gram of resin.

*Example 18.—n-Primary butyl resin from poly-α-bromacrylic acid obtained by polymerizing α-bromacrylic acid in n-primary butyl alcohol*

18 g. of α-bromacrylic acid were placed in 36 cc. of n-primary butyl alcohol, in an all glass apparatus equipped with a reflux condenser, and a calcium chloride tube to protect the materials in the apparatus from atmospheric moisture. The mixture was heated in a 50° C. water bath for 18 hours. At the end of this time, a white cake of polymer had precipitated and there was some viscosity in the supernatant n-primary butyl alcohol.

To the above reaction mixture were added 63 cc. of n-primary butyl alcohol and distilled water (10 volumes of alcohol to 1 of water) which had been previously heated to 70° C. The resulting mixture was heated on a steam bath with occasional stirring. In a short time there was obtained a thin orange solution. After 24 hours of heating on the steam bath, the entire reaction mixture was poured into 800 cc. of distilled water. The soft resin which precipitated was allowed to harden in contact with fresh portions of distilled water. The resulting cake of resin was transferred to a 200 cc. flask and quickly washed with 50 cc. of acetone to remove water. The resin was then shaken with 50 cc. of fresh acetone until a cloudy dispersion was obtained. The dispersion was then poured into 600 cc. of distilled water. The precipitated resin was washed with two 600 cc. portions of distilled water, in each case the resin being allowed to soak for one hour with the 600 cc. portion of water. The resin was filtered from the water and dried at 55° C. The resin contained 17.44% by weight of bromine and a carboxyl group content equivalent to 0.38 cc. of N sodium hydroxide per gram of resin.

The properties of our new resins will, of course, vary according to the molecular weight of the resin which is dependent upon the molecular weight (degree of polymerization) of the starting polymer which contains the α-halogenacrylic acid units. The molecular weight of the polymer containing the α-halogenacrylic acid units is conditioned, among other things, by the purity of the monomeric material from which it is prepared, by the temperature of polymerization, by the use of diluents, by the nature of the catalyst and by the atmosphere in which the polymerization is effected. The color of the starting polymeric materials is usually lessened by effecting polymerization in the presence of an inert gas, such as nitrogen.

To prepare film or sheet from our new resins, we first dissolve the resin in a suitable solvent, such as acetone, 1,4-dioxane, ethyl acetate, the monoethyl ether of ethylene glycol, a mixture of 90 volumes of acetone and 10 volumes of methyl alcohol, a mixture of 90 volumes of ethylene chloride and 10 volumes of acetone, a mixture of 80 volumes of methylene chloride and 20 volumes of ethyl alcohol or the like. With the n-primary butyl resin especially, about 3 volumes of solvent to 1 weight of resin is especially suitable. Such a solution is then cast onto a film-forming surface, such as a metal or glass plate or a revolving drum, to desired thickness and the resulting film or sheet is allowed to dry. Drying may be facilitated by blowing warm air over the drying film or sheet. When sufficiently dry, the film or sheet is stripped from the film-forming surface and "cured" by treating with warm air. The "curing" removes the residual solvent, giving the transparent film or sheet a low water susceptibility and low thermoplasticity.

Film or sheet made from our new resins prepared from primary alcohols of the formula $C_nH_{2n+1}OH$, wherein $n$ represents a positive integer of from 2 to 6 is characterized by low water susceptibility, low thermoplasticity, flexibility, high tensile strength and resistance to extension. The following table shows some of the properties of film or sheet made from typical of our new resins.

*Table*

| Resin | "Cure" | Thickness | Folds | Breaking load | Elongation |
|---|---|---|---|---|---|
|  | °C. | Inches |  | Kg. | Per cent |
| Example 1 | 65 | 0.005 | 20 | 10.6 | 16 |
| Do | 100 | .005 | 24 | 12 | 10 |
| Example 2 | 65 | .005 | 12 | 12.5 | 12 |
| Do | 100 | .005 | 10 | 13.0 | 8 |
| Example 3 | 65 | .005 | 19 | 12.7 | 20 |
| Do | 100 | .005 | 17 | 15 | 20 |
| Example 4 | 65 | .005 | 22 | 11.5 | 20 |
| Do | 100 | .005 | 8 | 16.2 | 9 |
| Example 6 | 65 | .005 | 25 | 10 | 15 |
| Do | 100 | .005 | 7 | 17.9 | 19 |
| Example 7 | 65 | .005 | 18 | 14 | 11 |
| Do | 100 | .005 | 20 | 15 | 6 |
| Example 8 | 65 | .005 | 25 | 11.5 | 13 |
| Do | 100 | .005 | 8 | 13.5 | 8 |
| Example 9 | 65 | .005 | 14 | 12 | 12 |
| Do | 100 | .005 | 10 | 11.7 | 12 |
| Example 10 | 100 | .005 | 100 | 5.6 | 20 |
| Example 11 | 65 | .005 | 10 | 13 | 6 |
| Do | 100 | .005 | 5 | 16 | 6 |
| Example 13 | 65 | .005 | 12 | 11.8 | 9 |
| Do | 100 | .005 | 1 | 7 | 4 |
| Example 15 | 65 | .005 | 15 | 11.0 | 9 |
| Do | 100 | .005 | 8 | 14 | 13 |

Film or sheet made from our new resins prepared from primary alcohols of the formula $C_nH_{2n+1}OH$, wherein $n$ represents a positive integer of from 2 to 6, is especially suitable as a support for photographic silver halide emulsions such as silver halide emulsions in which gelatin, polyvinyl alcohol or hydrolyzed cellulose esters are employed as the carrier. The film or sheet can be coated directly with the emulsion or can be coated with resinous or other known "subbing" materials before the photographic emulsion is applied. Our new resins prepared using primary alcohols of the formula $C_nH_{2n+1}OH$, wherein $n$ represents a positive integer of from 2 to 6, are particularly suitable for the manufacture of cinematographic film.

Our new resins are compatible with a number of compounds which serve to plasticize the resins. Typical of such plasticizers are the following:

Benzyl phthalate
Benzyl succinate
Butoxyethyl tetrahydrofuroate
Cyclohexyl acetate
Diethylene glycol monobutyl ether
Diethylene glycol dibutyrate
Ethoxy ethyl adipate
Ethoxyethyl sebacate
Ethylene glycol monobenzyl ether
Methoxyethyl phthalate
Tetrahydrofuryl adipate
Triacetin
Tripropionin
Triamyl phosphate
Tributyl phosphate
Triethylene glycol diacetate
Triphenyl phosphate
Camphor
Tribromo phenol Sheets of our new resins appropriately plasticized are well suited as a laminating material for the preparation of safety glass.

When suitably plasticized, our new resins can be molded by injection or compression processes, or can be extruded into sheeting of various thicknesses by the ordinary extrusion processes. The following example illustrates the molding of our new resins.

Example 19

10 g. of the n-primary butyl resin of Example 3 were dissolved in 70 cc. of acetone along with 7 g. of di-($\beta$-ethoxy-ethyl)-adipate. The resulting solution was coated on a glass plate and "cured" for 30 hours at 25° C. and then for 24 hours at 55° C. Final thickness of the film was about 0.02 inch. The film of resin was cut into small pieces and placed in a compression mold. Molding was effected at 200° F. at 12,000 pounds per square inch. A clear molded button was obtained.

In a similar manner, our resins can be molded using other placticizers and, if desired, fillers or binders.

The following example illustrates the extrusion of threads from our new resins.

Example 20

100 g. of the n-primary butyl resin of Example 3 were dissolved in 200 cc. of acetone. The resulting solution was forced through a stainless steel spinneret hole, 0.15 mm. in diameter, under 75 lbs. per square inch pressure. The extruded filament passed downward through a column of heated air 4½ feet long and 8 inches in diameter and was then wound onto a spool at 1600 feet per minute, using a draft of about 6. The air temperature at the top of the column was 46° C. and 105° C. at the bottom. The threads as received, and after curing at 100° C., showed good tensile strength and good elasticity, the elasticity of the cured threads lying between that of nylon and cellulose acetate threads.

What we claim as our invention and desire to be secured by Letters Patent of the United States is:

1. A polymer comprising $\alpha$-halogenacrylic acid units in which a part of the carboxyl groups have been converted to groups of the formula —COOR wherein R represents a saturated alcohol radical selected from the group consisting of primary and secondary alcohol radicals and has the formula $C_nH_{2n+1}$ wherein $n$ represents a positive integer, and a part of the carboxyl groups have reacted with a part of the halogen to form a lactone ring, said alcohol radical being the only type of alcohol radical present in the polymer, said polymer being obtained by the process of claim 6.

2. A poly-$\alpha$-chloracrylic acid in which a part of the carboxyl groups have been converted to groups of the formula —COOCH$_2$R wherein R represents an alcohol radical of the formula $C_nH_{2n+1}$ wherein $n$ represents a positive integer of from 1 to 5, and a part of the carboxyl groups have reacted with a part of the chlorine to give a lactone ring, said alcohol radical being the only type of alcohol radical present in the polymer, said polymer being obtained by the process of claim 10.

3. A poly-$\alpha$-chloracrylic acid in which a part of the carboxyl groups have been converted to carb-n-primary butoxyl groups, and a part of the carboxyl groups have reacted with a part of the chlorine to give a lactone ring, no other esterified carboxyl groups being present in the polymer, the polymer containing not more than about 10.19 per cent by weight of chlorine, said polymer being obtained by the process of claim 14.

4. A poly-$\alpha$-chloracrylic acid in which a part of the carboxyl groups have been converted to carb-n-propoxyl groups, and a part of the carboxyl groups have reacted with a part of the chlorine to give a lactone ring, no other esterified carboxyl groups being present in the polymer, the polymer containing not more than about 7.93 per cent by weight of chlorine, said polymer being obtained by the process of claim 15.

5. A poly-$\alpha$-chloracrylic acid in which a part of the carboxyl groups have been converted to carbethoxyl groups, and a part of the carboxyl groups have reacted with a part of the chlorine to give a lactone ring, no other esterified carboxyl groups being present in the polymer, the polymer containing not more than about 8.35 per cent by weight of chlorine, said polymer being obtained by the process of claim 16.

6. A process for preparing a resinous material comprising heating a polymer comprising $\alpha$-halogenacrylic acid units, in the presence of an alcohol selected from the group consisting of primary monohydric and secondary monohydric alcohols having the formula $C_nH_{2n+1}OH$ wherein $n$ represents a positive integer, said alcohol being the only type of alcohol present, to form lactone rings by reaction of a part of the halogen atoms and a part of the carboxyl groups and to esterify other of the carboxyl groups with the alcohol, the resulting resinous material containing less halogen than the original polymer.

7. A process for preparing a resinous material comprising heating a polymer comprising $\alpha$-chloracrylic acid units, in the presence of an alcohol selected from the group consisting of primary monohydric and secondary monohydric alcohols having the formula $C_nH_{2n+1}OH$ wherein $n$ represents a positive integer, said alcohol being the only type of alcohol present, to form lactone rings by reaction of a part of the chlorine atoms and a part of the carboxyl groups and to esterify other of the carboxyl groups with the alcohol, the resulting resinous material containing less chlorine than the original polymer.

8. A process for preparing a resinous material comprising heating a polymer comprising α-halogenacrylic acid units, in the presence of water and an alcohol selected from the group consisting of primary monohydric and secondary monohydric alcohols having the formula $C_nH_{2n+1}OH$ wherein $n$ represents a positive integer, said alcohol being the only type of alcohol present, to form lactone rings by reaction of a part of the halogen atoms and a part of the carboxyl groups and to esterify other of the carboxyl groups with the alcohol, the resulting resinous material containing less halogen than the original polymer.

9. A process for preparing a resinous material comprising heating a polymer comprising α-chloracrylic acid units, in the presence of water and an alcohol selected from the group consisting of primary monohydric and secondary monohydric alcohols having the formula $C_nH_{2n+1}OH$ wherein $n$ represents a positive integer, said alcohol being the only type of alcohol present, to form lactone rings by reaction of a part of the chlorine atoms and a part of the carboxyl groups and to esterify other of the carboxyl groups with the alcohol, the resulting resinous material containing less chlorine than the original polymer.

10. A process for preparing a resinous material comprising heating a polymer of α-chloracrylic acid, in the presence of water and a primary monohydric alcohol of the formula $C_nH_{2n+1}OH$ wherein $n$ represents a positive integer of from 2 to 6, said alcohol being the only type of alcohol present, to form lactone rings by reaction of a part of the chlorine atoms and a part of the carboxyl groups and to esterify other of the carboxyl groups with the alcohol, the resulting resinous material containing less chlorine than the original polymer.

11. A film or sheet prepared from the resinous material obtained by the process of claim 6.

12. A thread prepared from the resinous material obtained by the process of claim 6.

13. A molding article prepared from the resinous material obtained by the process of claim 6.

14. A process for preparing a resinous material comprising heating a homopolymer of α-chloracrylic acid, in the presence of sufficient n-primary butyl alcohol and water to provide a solution of the homopolymer, said alcohol being the only alcohol present, to form lactone rings by the reaction of a part of the chlorine atoms and a part of the carboxyl groups and to esterify other of the carboxyl groups with the alcohol, the resulting resinous material containing less chlorine than the original polymer.

15. A process for preparing a resinous material comprising heating a homopolymer of α-chloracrylic acid, in the presence of sufficient n-propyl alcohol and water to provide a solution of the homopolymer, said alcohol being the only alcohol present, to form lactone rings by reaction of a part of the chlorine atoms and a part of the carboxyl groups and to esterify other of the carboxyl groups with the alcohol, the resulting resinous material containing less chlorine than the original polymer.

16. A process for preparing a resinous material comprising heating a homopolymer of α-chloracrylic acid, in the presence of sufficient ethyl alcohol and water to provide a solution of the homopolymer, said alcohol being the only alcohol present, to form lactone rings by reaction of a part of the chlorine atoms and a part of the carboxyl groups and to esterify other of the carboxyl groups with the alcohol, the resulting resinous material containing less chlorine than the original polymer.

WILLIAM O. KENYON.
LOUIS M. MINSK.